Patented Mar. 2, 1943

UNITED STATES PATENT OFFICE 2,312,913

POLYAMIDE COATED FILM ELEMENT

James Emory Kirby, Wilmington, Del., assignor, by mesne assignments, to E. I. du Pont de Nemours & Company, Wilmington, Del., a corporation of Delaware No Drawing. Application August 18, 1941, Serial No. 407,379

2 Claims. (Cl. 117—139)

This invention relates to film comprising a synthetic linear polymer and having at least one protective coating thereon composed of a polymer of a long-chain monoaminomonocarboxylic acid. A specific embodiment of the invention relates to photographic elements comprising a support composed of a synthetic linear polymer, a protective coating for said support composed of a long chain monoaminomonocarboxylic acid polymer, and a light sensitive stratum. The invention further relates to processes of fabricating or preparing such films and elements.

The photographic industry has long desired a stable, transparent, non-inflammable film. However, in spite of tremendous research in cellulose and synthetic resin chemistry, cellulose nitrate has been used almost exclusively in professional cinematography. This is true in spite of its fire hazard. For amateur films and radiographic film wherein inflammability is highly undesirable, cellulose acetate and cellulose acetate/propionate are employed. Although these organic acid esters of cellulose are slow burning, their physical properties are not all that is desired, especially from the standpoint of water resistance, flexibility, and strength.

Certain types of polyamides have been proposed for photographic film base, but have been found to be somewhat water sensitive. This is particularly true of polyhexamethylene adipamide and related polyamides prepared from diamines and dicarboxylic acids. Photographic films made of such polyamides while they have exceptional strength, toughness, durability and flexibility, are not entirely satisfactory for use, e. g. in professional cinematography, where water tolerance is very low. This is true also of the most easily obtained amino acid type polyamide, namely, 6-aminocaproic acid polymer.

The above disadvantages of prior art photographic film base materials have been overcome and water-resistant, commercially practical, photographic material and elements composed of a synthetic linear polymer film support obtained by the hereinafter described invention.

In a practical aspect hereof, a self-supporting film composed of a synthetic linear polymer deficient in water-resistance is first made, for example, by extruding the molten polymer as a sheet into a cooling atmosphere or into a suitable quenching liquid, such as water or other inert non-solvent for the polymer. Or the polymer can be cast in sheet form onto a cool metal surface, or it can be formed into a sheet by rolling between metal rolls. Film can also be made from solutions of the polymer by evaporative or coagulative methods. A solution of a long chain water resistant monoaminocarboxylic acid polymer is then applied to one or both surfaces of the support or film base thus obtained to form a coating or layer. The aminocarboxylic acid polymer layer can be deposited directly on the surface or surfaces of the base or support or on a substratum or subbing layer which is directly imposed on the base. One or more layers of said aminocarboxylic acid polymers can be deposited.

The type of solvent used in the coating solution may vary quite widely. In general, however, a solvent is chosen which does not dissolve the film support. The particular solvent chosen depends somewhat on the long chain aminocarboxylic acid polymer and the thickness of the coating desired. In general, dilute solutions containing from 1 to 10 parts of the polymer in 99 to 90 parts of solvent are most practical. Relatively volatile solvents, i. e. boiling below 100° C., are preferred. Practical solvents include aliphatic alcohols, aliphatic alcohol-aromatic hydrocarbon mixtures, chlorinated hydrocarbon-alcohol mixtures, or combinations of these in any desired manner.

After coating, the composite film is allowed to set or harden or is dried by removing the solvent. This may conveniently be done by allowing the solvent to evaporate at moderate temperatures, e. g. 50° C., at normal or reduced pressure. The drying process can be expedited by the passage of a warm, dry, gaseous medium, such as air, nitrogen, etc., over the composite film.

In many instances, it is found advantageous to subject the film base material before coating to one or more operations designed to improve the physical properties of the films. One such operation is that of "cold working," previously referred to, wherein compressive stress is applied to the solid polymer, causing it to flow in a preferred direction. A convenient method for carrying out the process of cold working consists in passing the film of the polymer between "cold rolls," i. e., at temperatures substantially below the melting point of the polymer. Another operation ("setting") often found of value consists in subjecting the films under tension to the action of heat with or without simultaneous action of a non-solvent mild swelling agent for the polymer, e. g., water, steam or alcohol, and allowing it to cool under the continued application of tension.

More specific methods of preparing the base material or film support and suitable polymers therefor are described in U. S. Patents 2,216,735, 2,216,736, 2,212,770, 2,071,250, 2,071,252, 2,071,253, and 2,130,948. The preferred film supports are prepared from the synthetic linear polyamides described in the last two patents, particularly useful polyamides being polyhexamethylene adipamide, polyhexamethylene sebacamide, and the polyamide derived from p-bis(beta-aminoethyl) benzene and sebacic acid. Interpolyamides, e. g. those derived from a mixture of hexamethylene diammonium adipate and 6-aminocaproic acid or a mixture of hexamethylene diammonium adipate, hexamethylene diammonium sebacate and caprolactam, also form useful film bases. The polyamides are preferred because of their great strength and resistance to wear.

Subsequent to coating the film supports with long-chain aminocarboxylic acid polymers, according to to the further aspect of the invention, the film supports may be subbed or provided with a substratum coating in order to anchor other layers e. g. colloid layers to the support. Especially suitable "subbing" or coating solutions are described in Middleton, McQueen and Hill application, Serial No. 360,202, filed October 7, 1940. Other known "subbing" solutions, however, can be employed if desired.

If the composite film, i. e. the synthetic linear polymer film coated with long chain aminocarboxylic acid polymer, is to be used as a photographic film base, an outer surface which may be the layer composed of a long chain aminocarboxylic acid polymer or the surface or subbed surface of the film base is then coated with a photographic colloid layer. Various types of colloid materials may be deposited to form layers having photographic characteristics. Colloids containing filter dyes, anti-halation dyes or pigments, light sensitive materials, dye intermediates or color formers, sensitizing dyes or mixtures of one or more of these as is known to the art, may be coated on the base or a layer imposed thereon. One or more of such layers may be deposited or placed on each side of the protected film base.

The invention will be exemplified but is not intended to be limited by the following examples wherein the parts stated are parts by weight.

EXAMPLE I

Ten parts of a polymer prepared from 12-aminostearic acid of intrinsic viscosity (as defined in U. S. Patent 2,216,735) 0.81, and softening point 116° C. is dissolved in a mixture of 139 parts trichloroethylene and 51 parts ethyl alcohol. This solution is flowed upon a film of polyhexamethylene adipamide having an intrinsic viscosity of 0.9 and a melting point of 263° C. under oxygen-free conditions and the excess removed. After drying at 65° C., the film is observed to be clear, transparent and very tough. On flexing or tearing, no separation between the coating and the base can be observed. On sprinkling drops of water on the coated surface a definite increase in water-repellency over the uncoated film can be noted.

Another film of polyhexamethylene adipamide coated similarly to the first, but on both sides shows the same properties of water-repellency, strength and good adhesion. The decrease in water absorption of these two films over uncoated polyhexamethylene adipamide is shown in the following table, wherein the times indicated denote the duration of the period of immersion in water. In obtaining these data the size of the immersed sample was approximately four square centimeters, the total thickness 0.0063 inch and the thickness of the film before coating 0.005 inch.

Table I

| Film | Gain in weight | |
| --- | --- | --- |
| | 15 minutes | One hour |
| | Per cent | Per cent |
| Polyhexamethylene adipamide | 3.0 | 8.3 |
| Polyhexamethylene adipamide coated on one side | 1.8 | 7.1 |
| Polyhexamethylene adipamide coated on both sides | 0.9 | 3.4 |

This striking increase in resistance to water is particularly remarkable with such small samples where edge seepage accounts for a large proportion of the take-up.

EXAMPLE II

A film of epsilon-aminocaproic acid polymer, prepared from caprolactam is coated with an interploymer prepared from 45 parts of hexamethylene diammonium adipate and 55 parts 12-aminostearic acid by passing it through a solution of 6 parts of the interpolymer in 146 parts trichloroethylene and 54 parts ethanol. After drying at 100° C., a smooth, clear, transparent film is obtained. The increase in weight of a dry sample of this film after 50 minutes immersion in water is 3.9%, while that of an uncoated control film of epsilon-aminocaproic acid polymer at the end of the same time is 7.4%.

EXAMPLE III

A film of polyhexamethylene carbamate (M. P. 150° C.) prepared from hexamethylene glycol and hexamethylene diisocyanate, is coated with a polymer prepared from a mixture of 9- and 10-aminostearic acids by passing the film rapidly through a solution of 5 parts of the long chain amino acid polymer in 65 parts chloroform and 30 parts methanol and drying at 65° C. A tough, flexible, transparent, film of improved water-resistance results.

EXAMPLE IV

A self-supporting film of polyethylene adipate derived from ethylene glycol and adipic acid in equimolecular proportions, is passed through a solution of 6 parts of an interpolymer, prepared from 9 parts hexamethylenediammonium adipate, 5 parts epsilonaminocaproic acid, and 6 parts 12-aminostearic acid, dissolved in 80 parts ethanol and 20 parts toluene. The resulting film is dried at 80° C. in a current of warm dry air. A tough, elastic, transparent product of improved water-resistance results.

EXAMPLE V

A double coated film base prepared in accordance with the procedure set forth in Example I is then subcoated with a mixture containing 1.8% gelatin, 14.2% cresol, 30% methyl alcohol, and water and acetone in suitable proportions. After drying, the sub film base is coated with a panchromatized silver-gelatino bromide emulsion layer of 120 milligrams coating weight per square decimeter. After exposure and development the emulsion layer is found to be firmly anchored to the film support even under wet conditions.

EXAMPLE VI

A double coated film base prepared in accordance with the procedure set forth in Example I is coated on each side with a thin layer from a solution comprising a mixture of 2 parts of phenol and 50 parts of a cellulose acetate gelatin subcoat comprising a solution containing 1.8% gelatin and acetone, methyl alcohol, water and acetic acid in suitable proportions. The film is then coated on each side with a gelatin-silver bromide emulsion suitable for radiography. Satisfactory anchorage of the emulsion to the film base is obtained after exposure and development of the film in an X-ray developer.

Various other types of synthetic linear polymer film bases which are water sensitive can be similarly protected by applying a layer of a polymer of a long chain monoaminomonocarboxylic acid to the base in the manners herein described. Suitable base materials are described in the U. S. patents cited above and no need is seen for listing them in this specification. The polyamides described in U. S. 2,216,735, page 2, column 2, lines 66 to page 3, column 1, line 32, are preferred base materials. The polymers of long chain aminocarboxylic acids used in the present invention are prepared from a monoaminomonocarboxylic acid or an amide-forming derivative thereof having a chain containing at least nine carbon atoms, the amino group in said acid or derivative carrying at least one hydrogen atom and being attached to a carbon atom which is separated from the carboxyl group by at least four atoms. The term "long chain monoaminomonocarboxylic acid polymer" includes also interpolymers of such acids with other polymer-forming reactants in which the amount of said acids constitutes at least 25% of the total polymer-forming mass.

Useful polymers are included among the polyamides described in U. S. Patent 2,071,253. The preferred polymers however, are obtained by heating at amide-forming temperatures a polymer-forming composition comprising an acyclic monoaminomonocarboxylic acid which contains a chain of at least 16 atoms, has its amino group attached to a secondary carbon atom, and has at least five atoms separating the amino and carboxyl groups. It is to be understood that mention herein of an amino acid is intended to include also its amide-forming derivatives, such as the anhydride, ester, amide, and acid halide, as well as derivatives wherein the amino nitrogen atom bears an alkyl or a formyl group.

Structurally, these acyclic monoaminomonocarboxylic acids may be represented as follows:

$$\begin{array}{c} H \\ | \\ R'-C-R-COOH \\ | \\ H-N-H \end{array}$$

in which R is a divalent organic radical having a chain length of at least 4, R' is a monovalent organic radical, and R'—C—R—C, which represents the "chain length of the acid," has at least 16 atoms in the chain. Preferably R' is a hydrocarbon radical containing from 5 to 9 carbon atoms and preferably R is a hydrocarbon radical containing from 7 to 12 atoms. It will be observed that the minimum radical length of the amino acid is 7, wherein "radical length" refers to the number of atoms in the chain between and including the carbon of the carboxyl group and the nitrogen of the amino group. In terms of the above formula, the radical length is represented by the number of atoms in the chain N—C—R—C. The preferred acids have radical lengths of 10 to 15. Thus, 12-aminostearic acid which is one of the preferred amino acids has a radical length of 13 and a chain length of 18.

The polymers used to coat the film base according to this invention include not only polyamides derived solely from the above mentioned amino acids, but also polyamides derived from polymer-forming compositions containing in addition to an amino acid of the above type other polymer forming reactants, and particularly diamines and dibasic acids. These polyamides, which can be referred to as interpolyamides, are in general characterized by higher melting points than the simple long chain amino acid polymers, and can usually be prepared more economically. In order to secure a marked improvement in the water resistance of the film base with the use of an interpolyamide coating, however, the polymer-forming reactants from which the interpolyamide is derived should contain at least 25% of long chain amino acid.

The term "polyamide" as used herein includes not only the polymers which are obtained solely from the above mentioned amino acids or from mixtures of the above mentioned amino acids with other polyamide-forming reactants, but includes also the polymers obtained from mixtures of the above amino acids with other polymer-forming reactants, e. g. a mixture of glycol and dibasic acid. The polymers thus obtained contain a plurality of amide groups as an integral part of the main chain of atoms and may, therefore, be referred to as polyamides. On hydrolysis with hydrochloric acid the polyamides of this invention yield the hydrochloride of the amino acid used in their preparation.

An especially useful class of aminocarboxylic acids and polymers and their preparation are set forth in Hanford application, Serial No. 327,324, filed April 1, 1940. Other useful amino acids include 11-aminoundecanoic acid and 17-aminoheptadecanoic acid, but these polymers are more difficult to apply, from solution at least, because of their poorer solubility in organic solvents.

The polyamide coating layer need not be composed exclusively of the long chain amino acid polymers or interpolymers. The coating layer may contain other polymers or resins, e. g. vinyl resins, alkyd resins, and polymers of the phenol-aldehyde or urea-aldehyde types. Such products come within the scope of the present invention. In general, it has been found that the polymer used in preparing the coating solutions should contain at least 25% of the long chain amino acid polymer.

Although usually it is unnecessary, it is sometimes desirable to add to the long chain amino acid polymer coating solution softeners and/or plasticizers or other modifying agents. The long chain amino acid polymers may be dissolved in any suitable solvents to form the coating solution. For certain uses other modifying agents, e. g., dyes, pigments, antioxidants, etc., can be used.

Suitable solvents for the coating solution include alcohols such as methanol, ethanol, n-butanol, isopropanol, and furfuryl alcohol, and mixtures of alcohols with chlorinated solvents such as carbon tetrachloride, chloroform, tetrachloroethane, trichloroethylene, and tetrachloroethylene, ethylene chlorohydrin, etc. Mixtures of alcohols with aromatic hydyrocarbons, such as benzene and toluene, have utility in a large number of cases. The particular solvent chosen, of course, varies considerably with the particular linear polymer base and the particular long chain amino acid polymer chosen. The temperatures of the coating bath may also vary widely, depending upon the solvent employed and the polymer chosen, for example, from 15° C. to the boiling point of the solvent.

The solutions of the long chain amino acid polymers may be applied to the film base in any known fashion. For example, they may be "beaded" on from a transfer roll, extruded, poured on and leveled by means of a doctor knife, or applied by passage of the film base through the solution. It has been found that drying the film at elevated temperatures is particularly conducive to producing clear transparent haze-free films, although in many cases this operation is not necessary. Suitable drying temperatures lie within the range 30–150° C.

The high water resistance of the films of this invention, together with their clear transparent nature, makes them of value as a wrapping tissue, particularly in the packaging of materials which are desired to be exhibited to view and which are subject to deterioration by gain or loss of moisture. These tissues present the remarkable strength, toughness, and pliability common to linear polymers in general with the high degree of surface slippage and water resistance contributed by the long chain amino acid polymer.

A further advantage of the films of the present invention is their stability upon storage, even at elevated temperatures. Under such conditions the products show remarkable resistance to heat embrittlement.

While a preferred embodiment of the invention is concerned with adhering radiation sensitive silver halide layers, to the moisture-proofed or protected synthetic linear polymer film bases, it is not limited to that aspect. On the contrary, (1) heat sensitive layers of silver or mercurous oxalate in gelatin, (2) light sensitive diazo dye layers, (3) fulgides, i. e. anhydrides of fulgenic acids which are particularly sensitive to ultraviolet radiations, (4) antihalation layers, (5) light screening layers, (6) bichromated hydrophillic colloids, (7) dye component layers utilizing organic reversible colloid binding agents, and immobile color formers, etc. may be attached to the composite film base hereof, including a suitably subbed composite film base, in a manner similar to that described in Examples V and VI. It is to be observed that a photosensitive material can be applied to the composite film base of this invention without the use of any special adhesive, such as gelatin. The photosensitive material can be incorporated in the amino acid polymer itself or can be applied to the amino acid layer while it is rendered adhesive by heat or a solvent.

When the coated film is to be used as a photographic film base, the light-sensitive layer or layers applied can vary somewhat in their chemical constitution and are preferably silver halides. They can be simple or mixed and have various types of binding agents. As examples of practical coatings, mention is made of silver chloride, silver bromide, silver chloro-bromide, and silver iodo-bromide gelatin emulsions. Various emulsion components such as sensitizing dyes desensitizing dyes, fog inhibitors, emulsion stabilizers, immobile color formers, light screening dyes and pigments may be present in such layers. It has been found that these layers adhere fairly well to the composite film base. However, the outer polyamide coating can advantageously be subbed before additional colloid layers are applied.

The novel film elements of this invention which contain the above-described substrata are not restricted to any one type or for any one purpose. On the contrary, cut or roll film for still or motion picture photography or radiographic purposes, perforated positive and negative motion picture film stock, including film having a single sensitive layer for black and white pictures or film having a plurality of sensitive layers for color pictures or transparencies; stripping films, etc., are comprehended.

The film base hereof is especially useful for photographic film elements where non-shrinking characteristics are highly desired. Such films are useful in various types of lithographic processes including wide range lithographic processes, map making, and processes for making layout design plans and templates on sensitized aluminum foil. In the last mentioned type lithographic film elements are used for copying the original drawing and projecting the negative made on the lithographic film onto a sensitized aluminum base. Film of this type must have a limited amount of distortion from water-adsorption and these requirements are met by the elements of this invention.

The photographic film made from the polyamide coated film of this invention is slow burning and may be used without the fire hazard attached to the present use of cellulose nitrate films. Particularly advantageous in the photograhic field is the high degree of water resistance which the films manifest. This results in extremely small deformation during processing even when the films are left for long periods in running water. This resistance to aqueous solutions also prevents curling of the films upon drying, an important property in increasing the life of professional and amateur movie films which must lie flat to go through the projector satisfactorily. Of additional advantage in the case of cinematographic films is the excellent surface slippage of the self-supporting films of the present invention. This manifests itself in a lack of excessive friction in passage through projector or printer gates.

As many apparently widely different embodiments of this invention may be made without departing from the spirit and scope thereof, it is to be understood that the invention is not to be limited except as defined in the appended claims.

I claim:

1. A self-supporting film element comprising a film base composed essentially of polyhexamethylene adipamide having at least one surface thereof protected with at least one layer composed essentially of a 12-aminostearic acid polymer.

2. A self-supporting film element comprising a water sensitive film base composed essentially of a fusible water insoluble synthetic linear polycarbonamide having an intrinsic viscosity of at least 0.4 and which is capable of being formed into fibers showing by characteristic X-ray patterns orientation along the fiber axis having at least one surface protected with at least one layer composed essentially of a 12-aminostearic acid polymer.

JAMES EMORY KIRBY.